F. E. HEIWAY & J. J. WALLS.
Improvement in Cotton-Cultivators.
No. 128,393.    Patented June 25, 1872.
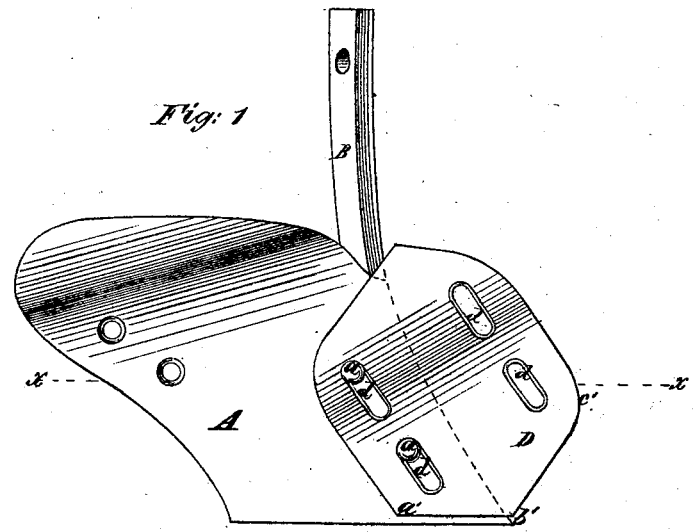
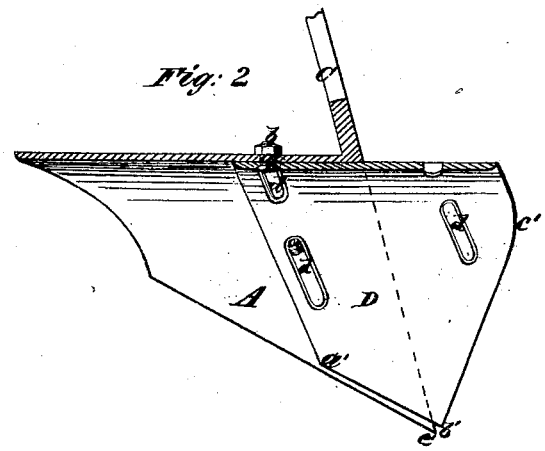

128,393

UNITED STATES PATENT OFFICE.

FRANK E. HEIWAY AND JOHN J. WALLS, OF HAZELHURST, MISSISSIPPI.

IMPROVEMENT IN COTTON-CULTIVATORS.

Specification forming part of Letters Patent No. 128,393, dated June 25, 1872.

*To all whom it may concern:*

Be it known that we, FRANK E. HEIWAY and JOHN J. WALLS, both of Hazelhurst, in the county of Copiah and State of Mississippi, have invented a new and useful Improvement in Cotton and Corn Scrapers; and we do hereby declare that the following is a full, clear, and exact description of the same, reference being had to the accompanying drawing making a portion of this specification, in which—

Figure 1 is a front view of the mold-board, standard, and wing of an apparatus constructed according to our invention. Fig. 2 is a horizontal section of the same taken in the line $x\ x$ of Fig. 1.

Similar letters of reference indicate corresponding parts in both figures.

The object of this invention is to provide a means whereby a plow of any ordinary or suitable construction can be adapted to the purposes of a corn or cotton scraper, so called from its use in the cultivation of cotton and corn, and whereby such implement can be kept in working condition for a longer period of actual service than has been found practicable with other devices hitherto employed for the same uses. To these ends the invention consists in the combination of a slotted reversible cutting wing or attachment with a plow and with suitably-arranged fastening screws or bolts, whereby the desired object is accomplished.

To enable others to understand the nature of our invention, we will proceed to describe it with reference to the drawing.

A is the mold-board of a land-side plow of any ordinary or suitable construction, and B is the standard of the same, whereby the mold-board is attached to the beam, handles, &c., of the plow, and by which is carried the usual running-shoe C, shown in Fig. 2. Passed through the front of and adjacent to the land-side edge of the mold-board A are screw-bolts $a$, with broad heads at the front, and capable of being tightened by nuts $b$ at the rear of the mold-board. D is a wing or attachment having a curvature lengthwise parallel to the sweep of the mold-board, and with its two ends of corresponding form to each other, as fully indicated in Fig. 1. This shape of the ends is such that when the wing is attached to the mold-board, as hereinafter explained, the portion from $a'$ to $b'$ will lap upon the surface of the mold-board, as represented in the drawing, while that from $b'$ to $c'$ will extend laterally outward and upward in such wise as to practically increase the surface of the mold-board without changing the cutting-point $e'$ of the apparatus. Contiguous to each edge of the wing D are slots $d$. In the attachment of the wing to the mold-board the bolts $a$ are passed through the slots $d$ at one side or the other, as the case may be, of the wing, and the bolts being tightened by the nuts $b$, as herein previously specified, the wing is securely held in place by the binding action of the bolt-heads lapping over or upon the edges of the slots. These slots, permitting the vertical adjustment of the wing, allow the same to be brought higher or lower, as occasion requires, and secured with its lower edge at any requisite distance from the lower or cutting edge of the plow or mold-board A, as may be found desirable in the exigencies of tillage. It will be seen that the wing, having both ends of corresponding form, as set forth, and furnished with the slots at either side, may, when one end becomes worn or injured by use, be reversed, to bring the other into position for operation, whereby the durability of the device is doubled, in comparison with what would be the case were the wing made incapable of reversal, as set forth. It should be mentioned that both ends of the wing are beveled on their external edges to render the ends more or less of a cutting character. As thus constructed, the wing applied and attached to the plow or mold-board, as hereinbefore specified, the apparatus constitutes a simple, durable, and efficient cotton or corn scraper, without interfering with the separate use of the plow when required by the removal of the wing therefrom.

What we claim as new, and desire to secure by Letters Patent, is—

The combination of the slotted reversible wing or attachment D with the mold-board A and fastening-bolts $a$, provided through the front of the said mold-board and adjacent to its land-side edge, substantially as and for the purpose herein set forth.

FRANK E. HEIWAY.
JOHN J. WALLS.

Witnesses:
C. W. BIRDSONG,
G. S. VARDEMAN.